Aug. 14, 1962 M. L. LOVE 3,049,022
TRANSMISSION CONTROL MECHANISM
Filed Feb. 14, 1961 2 Sheets-Sheet 1

INVENTOR.
M. L. LOVE

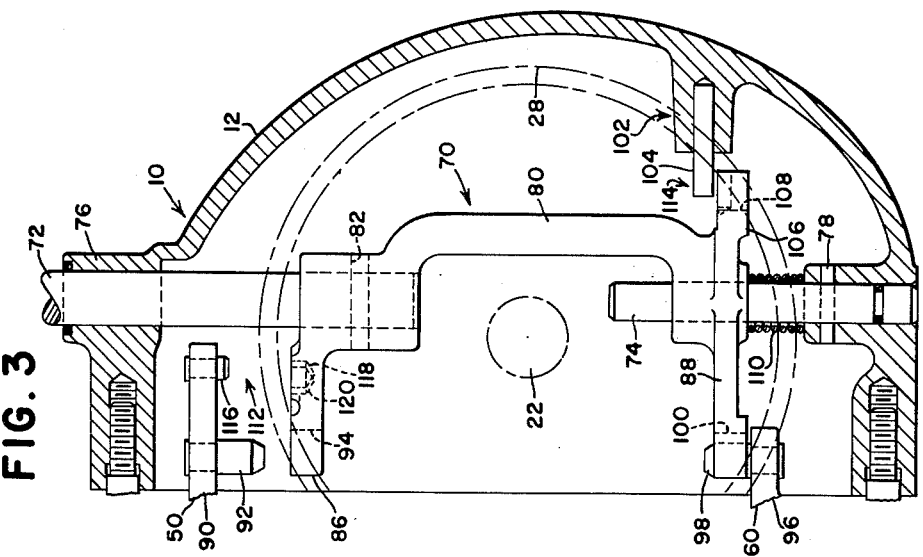
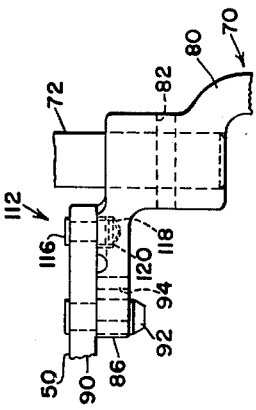
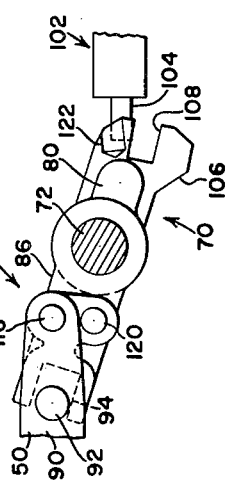
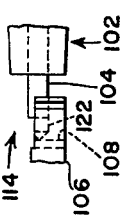
INVENTOR
M. L. LOVE

United States Patent Office 3,049,022
Patented Aug. 14, 1962

3,049,022
TRANSMISSION CONTROL MECHANISM
Mahlon L. Love, Osco, Ill., assignor to Deere & Company, Moline, Ill., a corporation of Delaware
Filed Feb. 14, 1961, Ser. No. 89,276
16 Claims. (Cl. 74—475)

The invention relates to a transmission and more particularly to means for controlling the shifting of drive elements therein.

In the typical sliding-gear transmission, the transmission housing is provided with one or more shifter rails, which carries one or more shifter forks for engaging shiftable gears or their equivalents, and much effort has been devoted to mechanisms for preventing shifted gears from coming out of mesh. The most common of such devices is the ordinary detent, but the obvious disadvantage there is that if the spring loading is sufficiently high to retain mesh or engagement, it becomes difficult to manually overcome same when deliberate shifting is desired. Accordingly, it is preferable to employ some form of positive lock, such as a latch or the like operated by means in addition to the usual shifter lever. This of course is attended by additional expense in the design and construction.

According to the present invention, such disadvantages are eliminated by the provision of a novel positive lock which incorporates an interlock between the shift controller and the shiftable member which is actuated by an additional movement of the shift controller in a direction other than its normal shifting direction. It is a further object of the invention to employ this novel construction in conjunction with a transmission having a plurality of shifter rails, whereby the lock-controlling motion of the shift lever is associated with movement of the lever or controller in its transition from one shift rail, for example, to the other. The invention has as a further object the provision of means for preventing the transition from one shift rail to the other unless the controller is first brought to a predetermined position, such as the neutral position. The invention features also the use of means for biasing the controller to operate in one of its ranges or phases so that in the transition from one range to the other the biasing means must be overcome. In connection with this feature, the biasing means is further employed as a means for conditioning engagement of the interlock means when at least one of the shifted positions is obtained.

The foregoing and other important objects and desirable features inherent in and encompassed by the invention will become apparent as a preferred embodiment thereof is disclosed, by way of example, in the ensuing description and accompanying sheets of drawings, the figures of which are described below.

FIG. 3 is a partial section similar to that shown in FIG. 1 and showing the controller shifted to a second-range position.

FIG. 4 is a fragmentary view in elevation and illustrating the engaged position of the interlock means.

FIG. 5 is a plan view of the portion shown in FIG. 4.

FIG. 6 is a fragmentary view showing the interlock means for the controller in its second-range condition.

Figure 2:
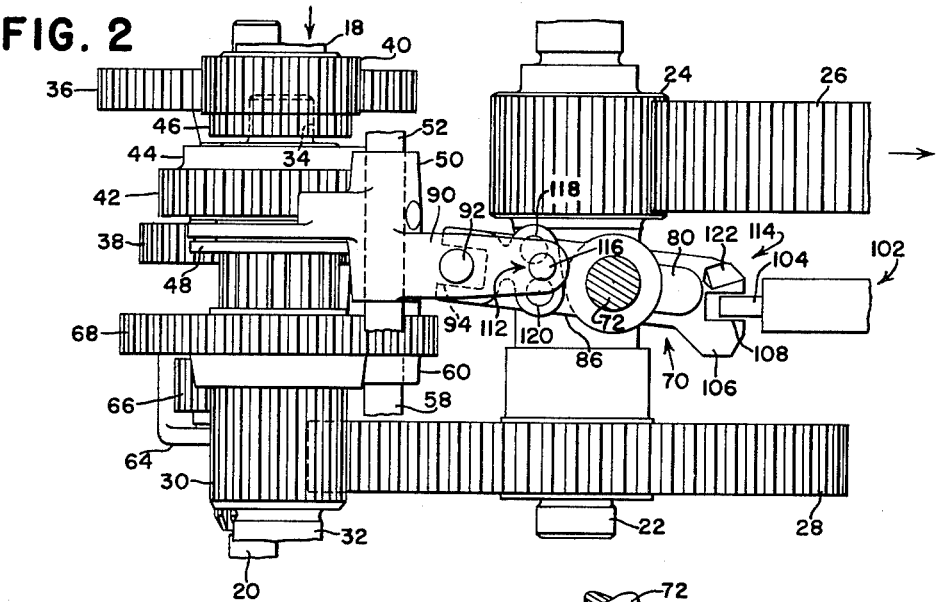
FIG. 2 is a plan view of the structure shown in FIG. 1, but with the housing structure removed.

The transmission chosen for purposes of illustration may be regarded as typical of a conventional drive train providing three speeds forward and one in reverse, and accordingly the gearing by itself is not considered material to the present invention, except by way of illustration. Therefore, it will be only briefly described.

The transmission includes basically a support, here in the form of a housing 10 made up of a pair of complementary halves 12 and 14 bolted or otherwise removably secured together as by cap screws 16. In FIG. 3, the half 14 has been removed in the interests of clarity.

Journaled in the housing in any suitable manner not important here is a driving or input shaft 18 which parallels a countershaft 20 and an output or driven shaft 22. In the particular drive train illustrated, the output shaft does not employ bevelled gearing to a rear axle, for example, but instead uses a bull pinion 24 which is in constant mesh with a bull gear 26. Here again, these details are immaterial. Also fixed to the output shaft 22 is a larger gear 28 which is in constant mesh with a pinion or gear 30 formed integrally with a shaft 32 that is coaxial with the input shaft 18 but which is rotatable relative to the shaft 18, being piloted therein in any conventional manner, as at 34.

The countershaft 20 has fixed thereto a pair of gears 36 and 38, the former being larger than the latter and being in constant mesh with a gear 40 fixed to the input shaft 18. A sliding gear 42 on the shaft 32 includes an internal clutch within a hub 44 which is selectively meshable with clutch teeth 46 on the input shaft gear 40, thus connecting the shaft 32 to rotate in unison with and at the speed of the input shaft 18, producing direct drive, since the pinion or gear 30 on the shaft 32 is in constant mesh with the driven gear 28 on the output shaft 22. The sliding gear 42 is shown in its neutral position in FIG. 2 and when shifted downwardly as seen by the reader, it will mesh with the gear 38 and will therefore drive the shaft 32 at a speed ratio determined by that between the gears 40—36 and 38—42, in this case producing second speed forward. The sliding gear 42 is provided with a collar or hub 48 having an annular groove within which are typically received the arms or fingers of a shifter member or yoke 50. This yoke is slidable back and forth among three positions on a shifter rail 52 which of course parallels the shafts 18 and 32. In this case, the shifter member or yoke 50 is capable of being moved among three positions; namely, neutral, second and high or direct. The shifter or yoke is typically detented to the rail 52 as at 56 (FIG. 1), it being understood that the rail 52 has three notches corresponding to the three positions just referred to.

A second or lower and parallel shifter rail 58 is carried by the support or housing in spaced relation below the rail 52, and the lower rail carries a lower shifter or shifter member 60 detented to the rail at 62 for movement among three positions; namely, neutral, low or first, and reverse. The yoke 60 has a pair of axially spaced arms 64 which embrace a low-reverse gear 66. That is, the gear 66 does not have an annular groove like that in the collar 48 on the upper sliding gear 42. Nevertheless, the same result is accomplished in effecting axial shifting of the gear 66, which is slidably splined to the countershaft 20 for shifting in one direction into mesh with a gear 68 fixed to the shaft 32 or in the other direction into direct mesh with the output shaft driven gear 28. When the gear 66 is shifted into mesh with the gear 68 on the shaft 32, the result is low or first speed forward, which is determined of course by the ratio established between the gears 40—36 and 66—68. When the gear 66 is shifted in the opposite direction, it meshes directly with the gear 28, as stated above, and the direction of rotation of the gear 28 is changed as respects its direction of rotation when driven by any of the other gearing. Therefore, the single speed in reverse is produced.

From the description thus far, it will be seen that the transmission basically comprises the parallel shafts with their associated gearing and the upper and lower shifters 50 and 60. However, here, as well as in the claims, the expressions "upper" and "lower" are used as terms of convenience and not of limitation, since the geographical aspects of the entire structure may be other than those illustrated.

The two rails 52 and 58, being parallel, lend themselves to control by means which is selectively changeable between two ranges in one of which the means, to be described below, is effective to shift one shifter exclusively of the other, and vice versa.

The control means comprises a controller or control element designated in its entirety by the numeral 70 and in this case including upper and lower coaxial shafts 72 and 74, the upper of which is journaled for both angular and axial movement in the housing, as at 76, and the lower of which is fixed or pinned to the housing as at 78. A yoke 80 has its upper portion pinned to the upper shaft 72, as at 82, and therefore is turnable with the shaft 72 as well as being axially movable therewith, the lower portion of the yoke 80 being slidably and journally carried by the upper end of the lower shaft 74 at 84. The shaft 72 may be extended upwardly in any suitable manner to a control station (not shown) for manual control by the vehicle operator, who may shift the controller axially between upper and lower or first and second operating ranges, in each of which the controller is rockable to effect speed selection, in a manner to appear in detail below.

The yoke 80 has integrally formed therewith or otherwise rigidly secured thereto upper and lower radial arms 86 and 88, together constituting arm means for selectively controlling the upper and lower shifters 50 and 60. The upper shifter 50 has integrally formed therewith or otherwise rigidly secured thereto a projecting part or portion 90 which carries a depending pin or lug 92 which is, in certain operating conditions, received in a notch or recess 94 in the terminal end of the upper arm 86. In this situation, the components 90 and 92 establish operating means connected between the arm means 86 on the controller 70 whereby the rocking of the controller about its axis will shift the shifter 50 back and forth on the rail 52 to make the selection between second and third speeds forward.

Figure 1:
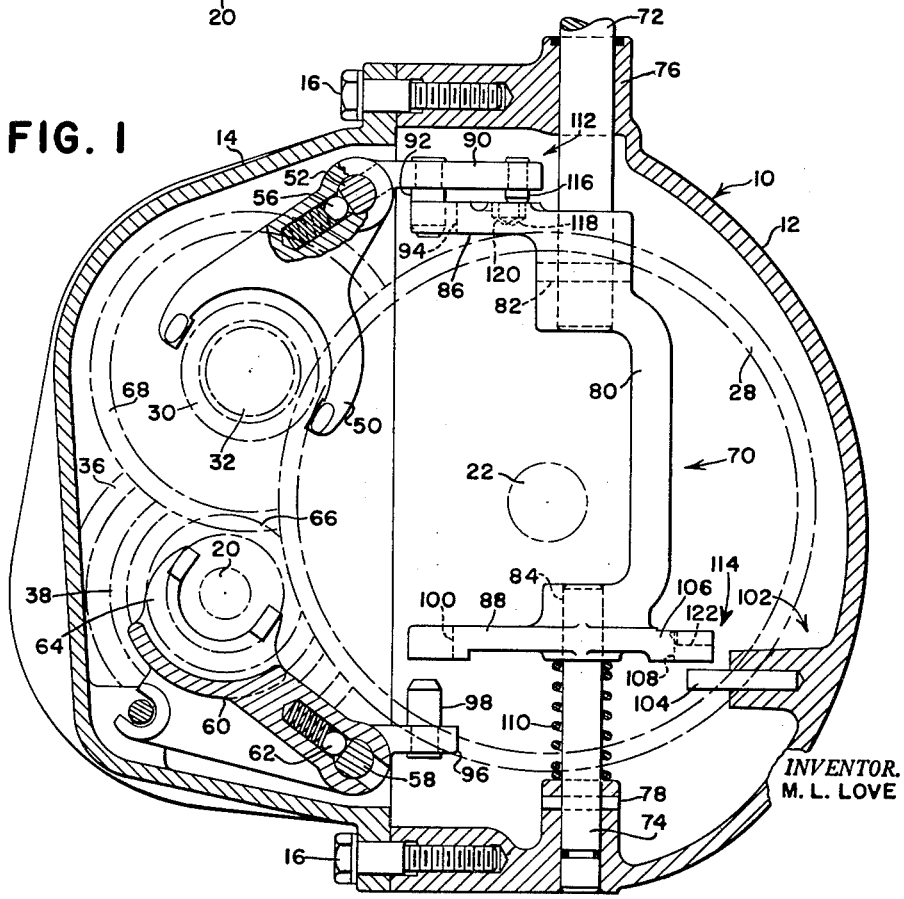
FIG. 1 is a sectional view through a transmission embodying the invention, the gearing in the transmission being illustrated in broken lines for the purposes of convenience.

The lower shifter 60 has integrally formed therewith or otherwise rigidly secured thereto a projecting part or portion 96 which is equipped with an upstanding pin or lug 98 which is at times receivable in a notch 100 in the lower arm 88. When the controller 70 is shifted downwardly from its upper-range position as shown in FIG. 1 to the lower-range position as shown in FIG. 3, the upper operating means 92—94 is disengaged as the arm 86 moves downwardly. Sequentially, engagement is established between the lower operating means 98—100 as the pin or lug 98 on the lower shifter 60 is received by the notch 100 in the lower arm 88. With the controller depressed to the lower range, rocking therefore about its axis makes the selection between the first speed forward and reverse, since it actuates the yoke or shifter 60 which in turn shifts the first-reverse gear 66.

The disengagement or disabling of the upper operating means 92—94 when the controller 70 is moved downwardly, and the simultaneous engagement for effectuating of the lower operating means 98—100, finds it parallel in the reverse thereof as the controller 70 is returned to its position of FIG. 1. For obvious reasons, the controller is designed so that it cannot effectuate both operating means 92—94 and 98—100 at the same time. Likewise, it is necessary that vertical shifting of the controller 70 be made possible only when both shifters 50 and 60 are in their neutral positions. For this purpose, the housing includes limit means, designated in its entirety at 102, and in this case including an integral portion of the housing which receives a pin 104 disposed so as to interfere with a lower extension 106 on the controller 70 except when the controller is in a neutral condition. This will be clear from FIG. 2, wherein it is shown that a notch 108 in the extension 106 is in register with the pin 104, thereby permitting the controller 70 to be shifted between its upper and lower ranges, it being further evident that the condition in which the notch 108 registers with the pin 104 also represents the neutral positions of both shifters 50 and 60. When the controller 70 is in its upper range position as shown in FIG. 1, the extension 106 thereon will overlie the pin 104 and when the controller is turned about its axis in its upper range condition, depression thereof to its lower range condition is impossible because the extension 106 will encounter the pin 104. In the present case, there is a limited amount of lost motion permitted between the pin 104 and the under surface of the stop portion established by the extension 106, the reasons for which will presently appear. Also, the controller 70 is biased to its upper range condition by biasing means in the form of a coiled compression spring 110 carried by the lower shaft 74 between the proximate housing portion and the underside of the controller. This spring is effective, among other things, to urge the controller 70 to its upper range condition. In the environment in which the present transmission is used, the most frequent speed changes will be between second and third and it is therefore desirable to provide the biasing means to maintain the controller 70 yieldably in its upper range condition. However, the operator may readily overcome the bias in the spring 110 so that he may depress the controller 70 for selection of first or reverse speeds.

Another function of the biasing means or spring 110 is to effectuate upper and lower interlock means designated respectively in their entireties at 112 and 114. The purpose of the upper interlock means is to prevent accidental shifting of the shifter 50 out of either of its third-speed or second-speed positions. The purpose of the lower interlock means is to prevent the lower shifter 60 from inadvertently shifting out of its first-speed position. As will be apparent from the description below, the lower interlock means could be further exploited to positively retain a reverse-speed position of the lower shifter 60 but, in the interests of economy, this phase is omitted, because reverse speed is relatively infrequently used.

The upper interlock means 112 comprises a pair of engageable and disengageable lock portions or parts, one of which is here in the form of a pin or lug 116 carried by the terminal end of the extension portion 90 on the upper shifter 50 and the other of which is represented by recess means including a pair of angularly spaced notches or recesses 118 and 120 in the upper surface of the upper arm 86 on the controller 70.

It will be observed that since the pin 116 is in effect an integral part of the shifter 50, and since the shifter 50 moves in a straight-line path, the pin 116 will move in a straight-line path parallel to the shifter rail 52. Further, since the recesses 118 and 120 are formed in the arm 186, these recesses will travel in arcs having the axis of the controller 70 as their centers. In a broad sense, the arc of either notch 118 or 120 may be regarded as a path nonparallel to or convergent with the straight-line path traveled by the pin 116. In the present case, the two paths will intersect at each of two points: one, where the pin 116 registers with the notch 118 and the other where the pin 116 registers with the notch 120. Registration in each case will occur because of the differences in radial spacing from the axis of the controller 70. As shown in FIG. 2, the pin 116 is substantially centrally between the two notches 118 and 120, the intervening upper surface portion of the arm 86 constituting means on which the pin 116 may ride when the controller 70 and shifters 50 and 60 are in their neutral positions, it being remembered that the controller is biased upwardly by the spring 110. With the controller in its upper range as shown in FIG. 1, it may then be shifted angularly in either direction to cause concurrent shifting of the shifter 50. As shown in FIG. 5, the controller 70 has been shifted in a direction incurring direct or third-speed drive. The pin 116 then follows its straight-line path, but as it does so it moves away from the axis of the controller 70. At the same time, the notch 118 is moving generally in the same direction but since it travels in an arcuate path it remains at the same distance from the axis of the controller 70. When the third-speed or direct-drive position is attained, the relative travel of the pin 116 and notch 118 will be such that the two will register. Since the controller 70 is biased upwardly by the spring 110, the pin 116 will be received by the notch 118. Therefore, the shifter and controller are interlocked against relative movement in shifting or out-of-shift directions. This is true, for reasons already outlined relative to the distances traveled by the pin 116 and notch 118, and the two must reverse their directions of travel and cannot do so because the straight-line path that 116 must travel is in conflict with the arcuate path that 118 must travel.

However, the interlock may be deliberately disengaged by a manual depression of the controller 70 against the force of the spring 110. It is at this point that the limited lost motion between the undersurface of the extension 106 and the stop pin 104 becomes important. This lost motion is sufficient to permit vertical disengagement between the pin 116 and notch 118 but the limit means 102 is still effective to prevent complete shifting of the controller 70 to its lower range position. That is to say, the pin 104 will still obstruct the extension 106, because the notch 108 in the third-speed position just described is not in register with the pin 104. Likewise, the limited lost motion just permitted is accommodated by the relationship between the pin 92 and notch 94 respectively in the arms 90 and 86, since the operating means established thereby between the two arms will still remain effective to enable return of the shifter 50 to its neutral position by rocking or turning of the controller 70. Also, the operating means is effective to permit further shifting in a counter-clockwise direction as viewed in FIG. 2 so that the controller may shift the shifter 50 to its second-speed position. In such case, the pin 116 again travels its straight-line path and the notch 120 now becomes effective to register with the pin 116 when the second-speed position of the shifter 50 is attained. Here again, the notch 120 travels in its arcuate path and ultimately registration will occur and the upward bias on the controller 70 wil effect engagement between the pin 116 and the notch 120, thus interlocking the controller and upper shifter 50 in the second-speed position, subject to being upset only by deliberate depression of the controller 70 to the extent permitted by the lost motion between the extension 106 and limit or stop pin 104.

As already described, when the controller 70 is in its upper range condition but in its neutral position, the notch 108 in the lower extension 106 will register or aline with the pin 104 of the limit means 102. At this time, the pin 116 of the upper interlock means 112 will ride on the intervening surface between the notches 118 and 120 in the controller upper arm 86, the upper interlock means therefore being disengaged in both phases (third-speed and second-speed). In these conditions, the operator may now fully depress the controller 70 to its lower-range position, simultaneously incurring disengagement of the upper operating means 92—94 and engagement of the lower operating means 98—100 between the lower controller arm 88 and the lower shifter 60. The controller 70 may now be turned about its axis to select first speed forward or reverse speed, and it is clear that shifting of the lower shifter is exclusive of shifting of the upper shifter, which is retained in its neutral position by its detent means 56.

The lower-range status of the controller 70 is illustrated in FIG. 3, wherein it will be seen that the lower extension 106 is now below the stop or limit pin 104, a slight vertical clearance being permitted to enable freedom of rocking movement of the controller in this range. The spring 110 is of course substantially fully compressed. Rocking of the controller 70 to obtain first-speed forward will be in the same direction as that employed to select third-speed forward; that is, clockwise as seen in FIG. 2. It is at this point that the lower interlock means 114 becomes effective. This means employs the stop pin 104 and a second notch or recess 122 in the upper surface of the extension 106, and the notch 102 is so arranged angularly as to be receivable of the pin 104 when the controller is in its first-speed position. The operator may release his downward force on the controller and the spring 110 will urge the controller upwardly so that the pin 104 is received in the notch 122. This not only limits upward movement of the controller to retain same in its lower range condition but also locks the controller in its first-speed position. The amount of vertical movement is of course not sufficient to permit disengagement of the lower operating means 98—100 or engagement of the upper operating means 92—94. The lost motion in the lower operating means of course accommodates the limited movement just referred to. It will be clear that a second notch similar to the notch 122 could be provided at the angularly opposite side of the notch 108 so that the controller could, if desired, be retained in its reverse-speed position. The reason why this phase is not exploited here has already been stated. Nevertheless, when the controller is shifted to its reverse-speed position, the blank portion of the extension 106 is still below the pin 104 so that the spring 110 cannot shift the controller upwardly a distance in excess of that permitted by interference between the pin 104 and extension 106.

The improved control mechanism thus achieves the objects previously set forth; it enables the selection between a plurality of shifter rails, for example, so that the shifter on each rail may be exclusively actuated; and, further, it employs novel interlock means on the rails, each exclusively of the other. Features and advantages other than those categorically enumerated will readily occur to those versed in the art, as will many modifications and alterations in the preferred embodiment illustrated and described, all of which may be achieved without departure from the spirit and scope of the invention.

What is claimed is:

1. In a transmission including a support and a shifter member carried thereby for back and forth shifting along a straight-line path between first and second positions, the improvement comprising: a control element rockable on the support on an axis offset from and normal to said path and having a radial arm member in overlapping relation to and having a connection with the shifter member for back and forth swinging about said axis between first and second positions respectively incurring the first and second positions of said shifter member; a first lock part on one member, including a recess spaced radially from said axis and facing the other member; a second lock part on the other member, including a lug facing and dimensioned to be received by the recess and disposed in such radially spaced relation to said axis and recess as to be out of register with the recess when said shifter member and control element are in their first positions and to register with the recess when said element and shifter member are in their second position; and means mounting the element on the support for axial shifting in one direction to engage the registered lug and recess for holding the element and shifter member in their second positions and for axial shifting in the opposite direction to disengage said lug and recess for enabling return of said element and shifter member to their first positions.

2. The invention defined in claim 1, including: means biasing the element in said one direction; and means on said one member including a surface portion bordering the recess and on which the lug rides when the lug and recess are out of register.

3. The invention defined in claim 1, in which: the connection between the shifter member and arm is constructed to enable relative movement thereof during axial shifting of said element; and stop means is provided for limiting axial shifting of the element in said other direction to an amount permitting disengagement of the lug and recess but preventing separation of the aforesaid connection while said shifter member and element are in their second positions.

4. The invention defined in claim 3, in which: said connection includes portions respectively on the arm and shifter members that are separable upon excess axial shifting of the element in said lug-recess disengaging direction; and the stop means is constructed to enable such excess axial shifting only when the element and shifter member are in their first positions.

5. In a transmission including a support and a shifter member carried thereby for back and forth shifting along a straight-line path between first and second positions, the improvement comprising: a control element rockable on the support on an axis offset from and normal to said path and having a radial arm member in overlapping relation to and having a connection with the shifter member for back and forth swinging about said axis between first and second positions respectively incurring the first and second positions of said shifter member; cooperative lock parts respectively on the members and selectively engageable and disengageable in opposite directions along a line parallel to said axis when the shifter member and control element are in their second positions, said parts being so arranged as to preclude interengagement thereof when said element and shifter member are in their first positions; and means mounting the element on the support for axial shifting in one of said directions to interengage said parts and in the other of said directions to disengage said parts when said element and shifter member are in their second positions.

6. The invention defined in claim 5, including: means biasing the element for axial movement in said one direction.

7. A transmission, comprising: a support; first and second shifters carried by the support for individual shifting back and forth respectively along parallel straight-line paths, each shifter having first and second positions spaced apart along its path; a controller carried by the support on an axis offset from and normal to said paths for bodily axial shifting back and forth between first and second ranges and for rocking back and forth about said axis in each range; radial arm means fixed to the controller and extending to the shifters for effecting mutually exclusive shifting of the first and second shifters respectively by first and second range rocking of the controller, said arm means having first and second connections respectively engaged with and disengaged from the first and second shifters upon shifting of the controller to its first range and respectively disengaged from and engaged with said first and second shifters upon shifting of the controller to its second range, said connections being engageable and disengageable along lines parallel to said axis and said first connection including lost-motion means enabling retention of its engagement with the first shifter during limited axial shifting of the controller toward but short of its second range; limit means operative between the controller and the support for preventing axial shifting of the controller from either range to the other except when said controller occupies a rocked position corresponding to the first positions of both shifters, said limit means having a stop portion effective when the controller is rocked in its first range to achieve the second position of the first shifter to enable the aforesaid axial shifting of the controller toward but short of its first range; and interlock means engageable between the arm means and the first shifter in said second position of the first shifter to lock said first shifter in said second position and to lock the controller against rocking away from said second position, said interlock means being disengageable upon the aforesaid shifting of the controller toward but short of its second range whereby to enable rocking of the controller to shift the first shifter to its first position and thus to condition the controller for shifting past said stop portion to its second range.

8. The invention defined in claim 7, including: means biasing the controller axially toward its first range to effectuate said interlock means.

9. The invention defined in claim 7, including: second interlock means effective when the controller is shifted to its second range and rocked to shift the second shifter to its second position for locking the controller against rocking, said second interlock means being disengageable upon axial shifting of the controller beyond its second range, and the aforesaid second connection between the arm means and the second shifter including lost-motion means enabling said last-named axial shifting while retaining engagement of the second connection.

10. The invention defined in claim 9, including: means biasing the controller axially in the direction of its first range for effectuating the two interlock means respectively in the second positions of the shifters.

11. In a transmission, shift control mechanism comprising: a support; first and second movable members respectively having first and second lock portions; means normally interconnecting the members for movement in unison between first and second positions; means guiding movement of the members on the support so that the first and second portions move respectively with the first and second members respectively along horizontal converging paths which intersect at a point corresponding to one of the positions of the members; means mounting the first member for additional movement thereof so that the first lock portion is vertically shiftable into and out of engagement with the second lock portion at said point of intersection; and said interconnecting means including a lost-motion connection enabling said vertical shifting of the first lock portion while retaining interconnection between the members.

12. The invention defined in claim 11, including: biasing means acting on the first member to move the first lock portion vertically toward engagement with the second lock portion.

13. In a transmission including a support and a shifter member carried thereby for back and forth shifting along a straight-line path between first and second positions, the improvement comprising: a control element rockable on the the support on an axis offset from and normal to said path and having a radial arm member in overlapping relation to and having a connection with the shifter member for back and forth swinging about said axis between first and second positions respectively incurring the first and second positions of said shifter member; a first lock part on and movable with the shifter member along a line parallel to said path; a second lock part on and movable with the arm in an arc intersecting said line at a point corresponding to the second positions of the shifter member and control element; one of said lock parts including recess means and the other including lug means receivable by the recess means at said point of intersection; and means mounting the element on the support for selective axial shifting in opposite directions to engage and disengage the lug and recess means at said point.

14. The invention defined in claim 13, including: means biasing the control element in the axial direction effective to engage the lug and recess means.

15. In a transmission including a support and a shifter carried thereby for movement along a shifter path between first and second positions, the improvement comprising: a controller; means mounting the controller on the support for movement along a control path between first and second positions and also for movement back and forth along a lock and release path other than said control path; means interconnecting the controller and shifter for movement of the two in unison so that movement of the controller along its control path and between its first and second positions effects movement of the shifter respectively between its first and second positions; and interlock means initially disengageable between the controller and shifter in the first positions of the two for enabling movement of the controller to its second position in its control path to achieve the second position of the shifter, said interlock means being then engageable between the shifter and controller by movement of the controller in one direction in its interlock and release path, whereby to lock the shifter in its second position, and said interlock means being disengageable between the shifter and controller in said second positions of the two by movement of the controller in the opposite direction in its interlock and release path so as to free the shifter for return movement to its first position by movement of the controller in its control path back to its first position.

16. The invention defined in claim 15, including: means biasing the controller to move in said one direction in its interlock and release path so as to facilitate engagement of the interlock means in the second positions of the controller and shifter.

References Cited in the file of this patent
UNITED STATES PATENTS

| | | |
|---|---|---|
| 1,758,427 | Burger | May 13, 1930 |
| 2,180,579 | Butzbach | Nov. 21, 1939 |
| 2,515,710 | Holmes | July 18, 1950 |